United States Patent
Gima et al.

(10) Patent No.: US 11,510,289 B2
(45) Date of Patent: Nov. 22, 2022

(54) LAMINATED GLASS

(71) Applicant: AGC INC., Tokyo (JP)

(72) Inventors: Yuhei Gima, Tokyo (JP); Seiichi Miyasaka, Tokyo (JP); Shigeru Nakamura, Tokyo (JP)

(73) Assignee: AGC INC., Tokyo (JP)

( * ) Notice: Subject to any disclaimer, the term of this patent is extended or adjusted under 35 U.S.C. 154(b) by 378 days.

(21) Appl. No.: 16/746,107

(22) Filed: Jan. 17, 2020

(65) Prior Publication Data

US 2020/0154528 A1 May 14, 2020

Related U.S. Application Data

(63) Continuation of application No. PCT/JP2018/030042, filed on Aug. 10, 2018.

(30) Foreign Application Priority Data

Aug. 25, 2017 (JP) .............................. JP2017-162339

(51) Int. Cl.
  *H05B 3/86*      (2006.01)
  *B32B 17/10*    (2006.01)
  *H05B 3/34*      (2006.01)

(52) U.S. Cl.
  CPC ......... *H05B 3/86* (2013.01); *B32B 17/10036* (2013.01); *H05B 3/34* (2013.01);
  (Continued)

(58) Field of Classification Search
  CPC ...... H05B 3/86; H05B 3/34; H05B 2203/002; H05B 2203/011; H05B 2203/014;
  (Continued)

(56) References Cited

U.S. PATENT DOCUMENTS 5,798,499 A * 8/1998 Shibata ................... H05B 3/84
  52/171.2
9,283,733 B2 * 3/2016 Blanchard ......... B32B 17/10036
  (Continued)

FOREIGN PATENT DOCUMENTS

JP    S55-113654 U    8/1980
JP    H06-47060 U    6/1994
  (Continued)

OTHER PUBLICATIONS

International Searching Authority, "International Search Report," issued in connection with International Patent Application No. PCT/JP2018/030042, dated Oct. 23, 2018.
(Continued)

*Primary Examiner* — Shawntina T Fuqua
(74) *Attorney, Agent, or Firm* — Foley & Lardner LLP (57) ABSTRACT

A laminated glass includes a pair of glass plates facing each other, a pair of intermediate adhesive layers positioned between the pair of glass plates and in contact with the respective glass plates, a wiring positioned between the pair of intermediate adhesive layers, and one set of bus bars connected to the wiring. The wiring includes conductive thin wires arranged in parallel with each other between the bus bars. The bus bars are arranged alongside a same edge of the glass plates. In an area corresponding to at least a part of a principal face of the glass plates, the conductive thin wires are arranged as one aggregation and include at least one turnaround. A resistance value of each of the conductive thin wires is within a range of 10% or less with respect to an average value of resistance values of the conductive thin wires.

13 Claims, 11 Drawing Sheets

(52) U.S. Cl.
CPC .. *H05B 2203/002* (2013.01); *H05B 2203/011* (2013.01); *H05B 2203/014* (2013.01)

(58) Field of Classification Search
CPC ........ H05B 2203/003; H05B 2203/004; B32B 17/10036; B32B 17/06; B32B 7/02; B60S 1/02

See application file for complete search history.

(56) References Cited

U.S. PATENT DOCUMENTS

| | | |
|---|---|---|
| 2004/0159645 A1 | 8/2004 | Gillner et al. |
| 2016/0174295 A1 | 6/2016 | Klein et al. |
| 2019/0159296 A1 | 5/2019 | Suetsugu et al. |

FOREIGN PATENT DOCUMENTS

| | | |
|---|---|---|
| JP | H08-72674 A | 3/1996 |
| JP | 2004-528699 A | 9/2004 |
| JP | 2016-020145 A | 2/2016 |
| JP | 2016-532624 A | 10/2016 |
| JP | 2017-117785 A | 6/2017 |

OTHER PUBLICATIONS

International Searching Authority, "Written Opinion," issued in connection with International Patent Application No. PCT/JP2018/030042, dated Oct. 23, 2018.

\* cited by examiner

LAMINATED GLASS

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2018/030042 filed on Aug. 10, 2018 and designating the U.S., which claims priority of Japanese Patent Application No. 2017-162339 filed on Aug. 25, 2017. The entire contents of the foregoing applications are incorporated herein by reference.

BACKGROUND OF THE INVENTION

1. Field of the Invention

The present invention relates to a laminated glass.

2. Description of the Related Art

In window glass for vehicles such as automobiles and railways, laminated glass in which electric heating wiring is sandwiched (electric heating glass) for removing frozen moisture attached to the window glass in winter (i.e., de-icing) and clear the fog on the window glass (i.e., defogging) is widely known.

Specific examples of the electric heating glass include a so-called heat wiring produced by attaching mainly thin metal wiring to an intermediate adhesive layer in advance (for example, refer to PTL 1) and laminated glass in which a substrate formed with conductive wiring is sealed (for example, refer to PTL 2).

Although the above electric heating glass can be applied to side glass for an automobile, the side glass is often not in a simple rectangular or trapezoid shape as compared with the windshield or the like, and it is difficult to uniformly generate heat.

In particular, the side glass that can be lifted and lowered cannot provide a sufficient concealment area through printing, and a bus bar is desired to be arranged alongside the lower side from the viewpoint of appearance and protection of the conductive elements from moisture, which makes the current flow path to be complicated as compared with the windshield. Therefore, the structure for sealing the metal wiring is difficult to manufacture.

In addition, laminated glass in which a conductive coating divided into a plurality of segments by an insulating wiring is arranged in a planar manner between outer glass and inner glass is also proposed (for example, refer to PTL 3). However, the presence of the insulating wiring is not preferable in terms of appearance.

CITATION LIST

Patent Literature

[PTL 1] Japanese Laid-Open Patent Publication No. H08-072674
[PTL 2] Japanese Laid-Open Patent Publication No. 2016-20145
[PTL 3] Japanese Translation of PCT Application No. 2016-532624

SUMMARY OF THE INVENTION

The present invention has been made in view of the above issues, and it is an object of the present invention to improve appearance and heat uniformity in an electrically heatable laminated glass.

A laminated glass according to the present application is a laminated glass including a pair of glass plates facing each other, a pair of intermediate adhesive layers positioned between the pair of glass plates and each being in contact with a corresponding one of the glass plates, a wiring positioned between the pair of intermediate adhesive layers, and one set of bus bars connected to the wiring, wherein the wiring includes a plurality of conductive thin wires arranged in parallel with each other between the bus bars constituting the one set, the bus bars being arranged alongside a same edge of the glass plates, wherein in an area corresponding to at least a part of a principal face of the glass plates, the conductive thin wires are arranged as one aggregation and include at least one turnaround, and wherein a resistance value of each of the conductive thin wires is within a range of 10% or less with respect to an average value of resistance values of the conductive thin wires.

According to the technique of the disclosure, in an electrically heatable laminated glass, the appearance and heat uniformity can be improved.

DETAILED DESCRIPTION OF THE PREFERRED EMBODIMENTS

Hereinafter, modes for carrying out the invention will be described with reference to the drawings. In the drawings, the same constituent elements are denoted with the same reference numerals, and redundant description thereabout may be omitted.

First Embodiment

Figure 1:
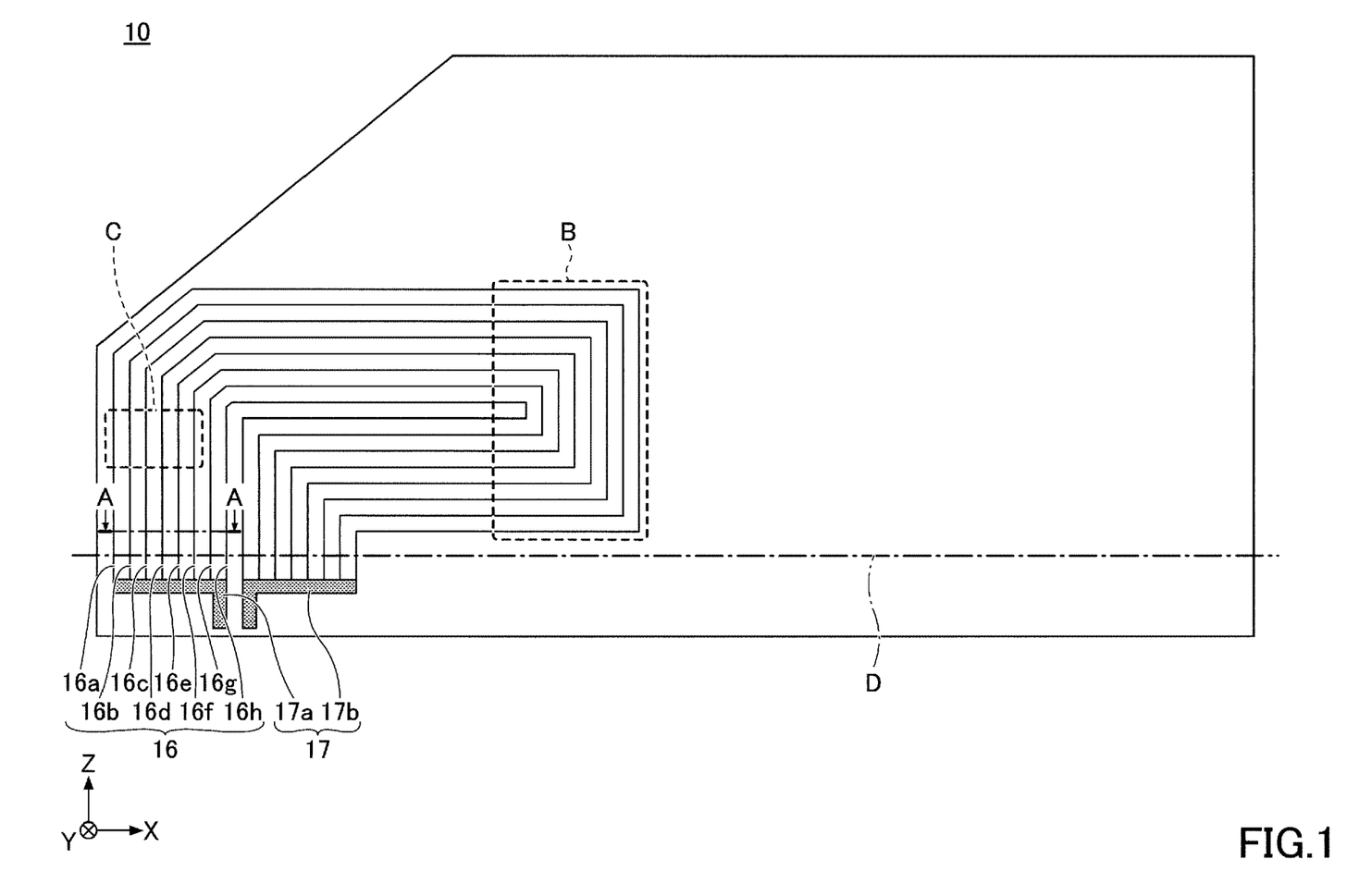
FIG. 1 is a drawing illustrating a side glass for a vehicle according to a first embodiment.
Figure 2A:
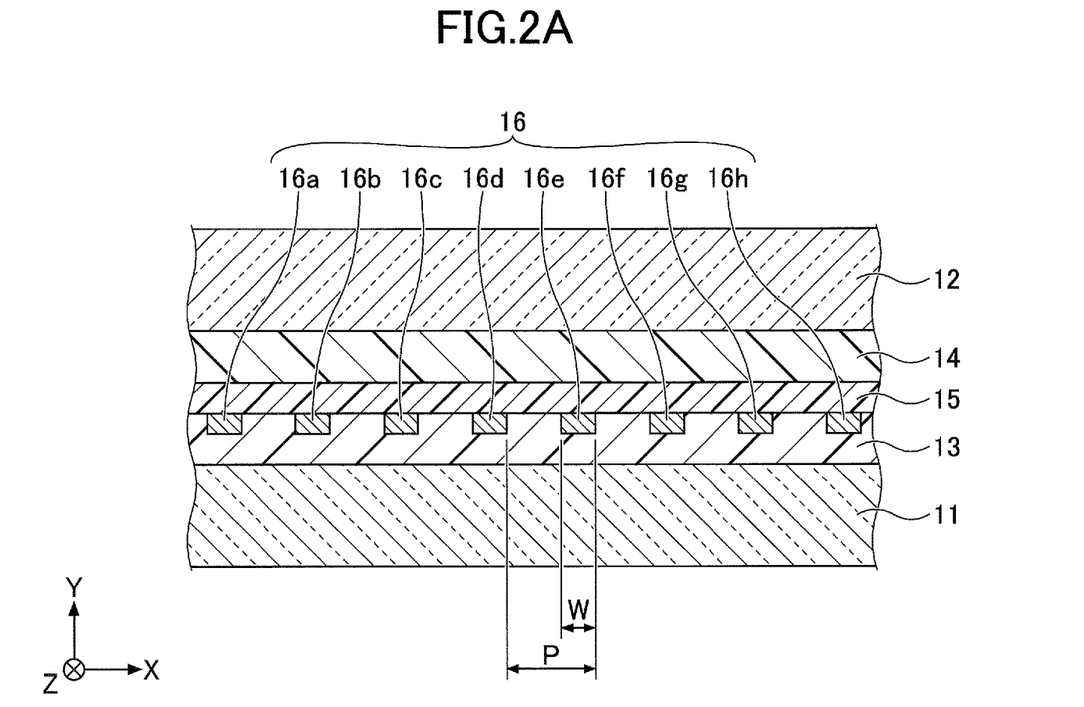
FIG. 2A is a partially enlarged cross-sectional view (part 1) taken along line A-A of FIG. 1.

FIG. 1 is a drawing illustrating a side glass for a vehicle according to the first embodiment. FIG. 2A is a partially enlarged cross-sectional view taken along line A-A of FIG. 1. In FIG. 1, a left-hand side (the base of arrow X) corresponds to the front, and a right-hand side (the tip of arrow X) corresponds to the rear, when side glass 10 is attached to the vehicle. In FIG. 1, the lower side (the base of arrow Z) corresponds to the floor side, and the upper side (the tip of the arrow Z) corresponds to the roof side, when the side glass 10 is attached to the vehicle. In FIG. 1, an area below an alternate long and short dash line D is an area that is hidden behind the vehicle body and cannot be seen from the outside of the vehicle when the side glass 10 is attached to the vehicle.

As illustrated in FIG. 1 and FIG. 2A, the side glass 10 includes, as main constituent elements, a pair of glass plates 11 and 12, a pair of intermediate adhesive layers 13 and 14, and a base material 15 formed with a wiring 16 and bus bars 17, and is laminated glass that can be electrically heated. The side glass 10 may be either a non-curved shape or a curved shape. A form in which the pair of intermediate adhesive layers 13 and 14 and the base material 15 formed with the wiring 16 are stacked is also referred to as an intermediate film.

The glass plates 11 and 12 are disposed so as to face each other. As the glass plates 11 and 12, for example, soda lime glass, aluminosilicate, organic glass or the like can be used. The thickness of each of the glass plates 11 and 12 can be appropriately determined in consideration of various performances such as stone chip resistance, ease of molding, and the like, and can be, for example, about 0.3 mm to 3 mm.

The shapes of the glass plates 11 and 12 are not particularly limited as long as the glass plates 11 and 12 have a shape having a side alongside which the bus bars 17 are disposed. Examples of the shape include a rectangle, a bevel rectangle in which at least one corner of the rectangle is beveled, and a rounded rectangle in which at least one corner is rounded. In the present embodiment, as an example, the shape of the glass plates 11 and 12 is a beveled rectangle in which one corner of the rectangle is slanted.

In order to quickly de-ice and defog, the thickness of at least one of the glass plates 11 and 12 is preferably 2.0 mm or less, and more preferably 1.8 mm or less. In particular, in order to achieve both of stone chip resistance and high-speed de-icing and defogging, the thickness of the glass plate at the vehicle outer side is preferably 1.8 mm or more, and more preferably 2.0 mm or more. The thickness of the glass plate at the vehicle inner side is preferably 2.0 mm or less, and more preferably 1.8 mm or less.

The intermediate adhesive layers 13 and 14 adhere to the glass plate 11 and the glass plate 12 between which the base material 15 formed with the wiring 16 and the bus bars 17 is sandwiched. The intermediate adhesive layer 13 is disposed between the glass plate 11 and the glass plate 12 so as to be in contact with the glass plate 11 and the base material 15 (at the side where the wiring 16 and the bus bars 17 are formed), and covers the wiring 16 and the bus bars 17. The intermediate adhesive layer 14 is disposed between the glass plate 11 and the glass plate 12 so as to be in contact with the glass plate 12 and the base material 15 (at the side where the wiring 16 and the bus bars 17 are not formed).

The intermediate adhesive layers 13 and 14 are typically made of a thermoplastic resin. Examples of thermoplastic resins include those that are conventionally used for this kind of purpose, such as, e.g., plasticized polyvinyl acetal resin, plasticized polyvinyl chloride resin, saturated polyester resin, plasticized saturated polyester resin, polyurethane resin, plasticized polyurethane resin, ethylene-vinyl acetate copolymer resin, and ethylene-ethyl acrylate copolymer resin. Also, a resin composition containing a modified block copolymer hydride described in Japanese Laid-Open Patent Publication No. 2015-821 can also be suitably used.

Among these, a plasticized polyvinyl acetal resin is preferably used, since the plasticized polyvinyl acetal resin provides a product with an excellent balance of various properties such as transparency, weather resistance, strength, adhesion, penetration resistance, impact energy absorption, moisture resistance, heat insulation, and sound insulation. These thermoplastic resins may be used alone, or two or more may be used in combination. A term "plasticized" in the plasticized polyvinyl acetal resin means that the plasticized polyvinyl acetal resin is plasticized with an addition of a plasticizer. This also applies to other plasticized resins.

Examples of the polyvinyl acetal resin include a polyvinyl formal resin obtained by reacting polyvinyl alcohol (hereinafter sometimes referred to as "PVA" if necessary) and formaldehyde, a narrowly-defined polyvinyl acetal resin obtained by reacting PVA with acetaldehyde, and polyvinyl butyral resin (hereinafter sometimes referred to as "PVB" if necessary) obtained by reacting PVA with n-butyraldehyde. In particular, the PVB is preferably used, since the PVB provides a product with an excellent balance of various properties such as transparency, weather resistance, strength, adhesion, penetration resistance, impact energy absorption, moisture resistance, heat insulation, and sound insulation. These polyvinyl acetal resins may be used alone, or two or more may be used in combination. However, the material forming the intermediate adhesive layers 13 and 14 is not limited to the thermoplastic resin.

The thickness of each of the intermediate adhesive layers 13 and 14 is not limited, but the thickness of one of the intermediate adhesive layers 13 and 14 is preferably 0.01 mm or more and 0.20 mm or less. The thickness of the other of the intermediate adhesive layers 13 and 14 is preferably 0.38 mm or more and 2.28 mm or less from the viewpoint of imparting functions such as heat insulation and sound insulation to the intermediate adhesive layer. The thickness of the intermediate adhesive layer arranged to be in contact with the wiring (i.e., the intermediate adhesive layer 13 in the present embodiment) is preferably thinner than the thickness of the intermediate adhesive layer arranged not to be in contact with the wiring 16 (i.e., the intermediate adhesive layer 14 in the present embodiment).

When the thickness of one of the intermediate adhesive layers is thinner than the thickness of the other of the intermediate adhesive layers, and the thickness of the thinner intermediate adhesive layer is 0.20 mm or less, the optical distortion (heat distortion) caused by the energizing of the wiring 16 can be effectively reduced.

The base material 15 serves as a support for forming the wiring 16 and the bus bars 17, and can be made of, for example, a film-like base material such as, e.g., polyethylene terephthalate, polyethylene naphthalate, polycarbonate, polystyrene, and cyclic polyolefin. The thickness of the base material 15 can be, for example, about 25 to 150 μm.

The wiring 16 and the bus bars 17 are formed on one of the faces of the base material 15 (i.e., a face of the base material 15 facing the glass plate 11 in the present embodiment).

Figure 2B:
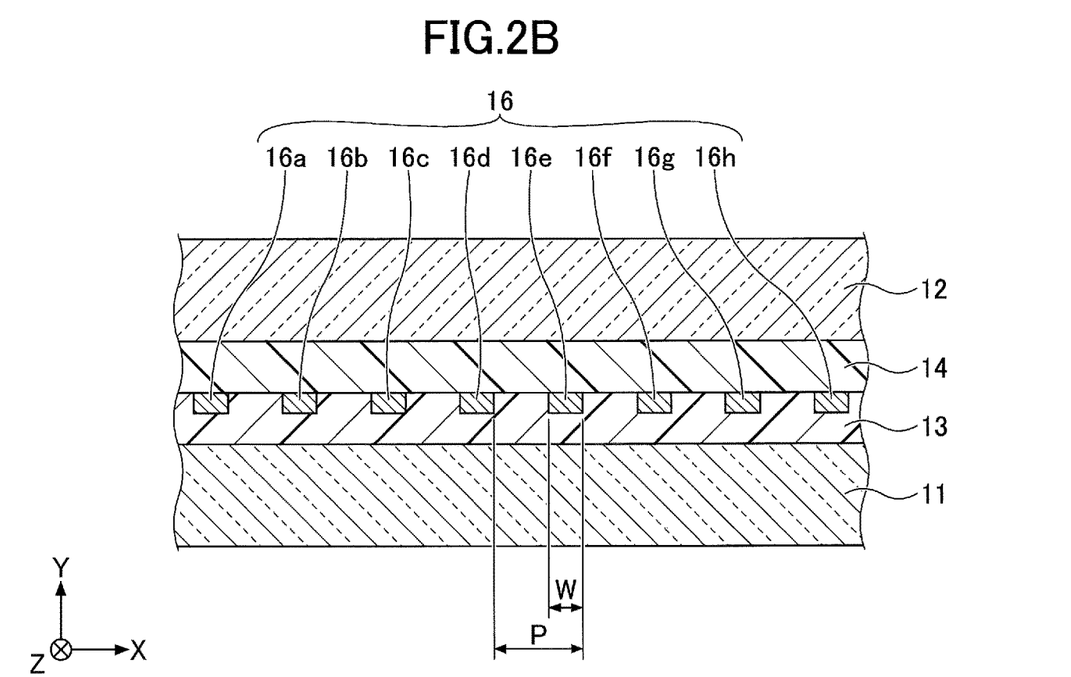
FIG. 2B is a partially enlarged cross-sectional view (part 2) taken along line A-A of FIG. 1.

Further, as illustrated in FIG. 2B, the base material 15 may not be provided, and the intermediate adhesive layer 13 or 14 can be used as a support for the wiring 16 and the bus bars 17. In this case, the wiring 16 and the bus bars 17 are preferably located between the intermediate adhesive layers 13 and 14. In FIG. 2B, the interface between the intermediate adhesive layer 13 and the intermediate adhesive layer 14 is clearly indicated, but the interface may be unclear due to the integration of the intermediate adhesive layer 13 and the intermediate adhesive layer 14. In the following description, the structure of FIG. 2A having the base material 15 is adopted as an example.

The wiring 16 includes conductive thin wires 16a to 16h arranged in parallel with each other on one of the faces of the base material 15. However, the wiring 16 including eight conductive thin wires 16a to 16h is an example, and the wiring 16 may include any number of two or more conductive thin wires.

One set of the bus bars 17 includes a first pole 17a and a second pole 17b. The first pole 17a of the bus bar 17 is, for example, a positive electrode, and is connected to the positive side of a power source such as a battery mounted on the vehicle via a lead or the like. The second pole 17b of the bus bar 17 is, for example, a negative electrode and is connected to the negative side of the power source such as the battery mounted on the vehicle via a lead or the like.

Both of the first pole 17a and the second pole 17b of the one set of the bus bars 17 are arranged alongside a same side (same edge) of the side glass 10 (for example, a lower side or a lower edge). The bus bars 17 are preferably arranged below the alternate long and short dash line D. This is because the area below the alternate long and short dash line D is hidden in the vehicle body when the side glass 10 is attached to the vehicle, and therefore, this does not disturb the appearance. Furthermore, when the bus bars 17 are arranged alongside the lower side, the concealed area is sufficient and the bus bars 17 and the wiring 16 can be protected from moisture and the like, and therefore, the bus bars 17 are preferably arranged alongside the lower side.

Further, in the present embodiment, the conductive thin wires 16a to 16h are arranged as a single aggregation in which a current flows in the same direction, so that the bus bars 17 form a single set, which can realize a bus bar arrangement that is simple and excellent in productivity.

Each of the conductive thin wires 16a to 16h constituting the wiring 16 includes one turnaround (portion B in FIG. 1). First ends of the conductive thin wires 16a to 16h are electrically connected to the first pole 17a of the bus bar 17, and seconds ends of the conductive thin wires 16a to 16h are electrically connected to the second pole 17b of the bus bar 17.

The number of times the direction of the current flowing through each conductive thin wire changes by 180 degrees between the first pole 17a and the second pole 17b of the bus bars 17 is referred to as the number of turnarounds. In the example of FIG. 1, the number of turnarounds is one (i.e., portion B of FIG. 1) for each of the conductive thin wires 16a to 16h, but the number of turnarounds may be two or more in the first embodiment as indicated in embodiments described later.

When a current is supplied to the conductive thin wires 16a to 16h from the power source such as a battery via the bus bars 17, the conductive thin wires 16a to 16h generate heat. The heat generated by the conductive thin wires 16a to 16h is conducted to the glass plates 11 and 12, warming the glass plates 11 and 12, and clearing fog caused by condensation on the glass plates 11 and 12 and de-icing the window glass, thus enabling maintaining of high visibility for the passengers.

Each resistance value of the conductive thin wires 16a to 16h is in the range of 10% or less with respect to the average value of the resistance values of the conductive thin wires 16a to 16h. Here, resistance values of the conductive thin wires 16a to 16h between the first pole 17a and the second pole 17b of the bus bars 17 are denoted as Ra, Rb, Rc, Rd, Re, Rf, Rg, and Rh, respectively. In this case, the average value Rm of the resistance values of the conductive thin wires 16a to 16h is (Ra+Rb+Rc+Rd+Re+Rf+Rg+Rh)/8. Accordingly, $0.9 \times Rm \leq Ra \leq 1.1 \times Rm$ holds for Ra. This inequality also holds with regard to Rb to Rh.

The resistance values of the conductive thin wires 16a to 16h can be adjusted by changing one or both of the length and width of each of the conductive thin wires 16a to 16h.

As described above, the resistance value of each of the conductive thin wires 16a to 16h is configured to be within a range of 10% with respect to the average value of the resistance values of the conductive thin wires 16a to 16h, and this enables the area where the conductive thin wires 16a to 16h are disposed to be heated uniformly. Conversely, if one of the conductive thin wires 16a to 16h has a resistance value that is higher by more than 10% with respect to the average value of the resistance values of the conductive thin wires 16a to 16h, it is difficult to uniformly heat the area where the conductive thin wires 16a to 16h are disposed, and there occur problems such as a failure to uniformly clear the fog.

The material of the conductive thin wires 16a to 16h is not particularly limited as long as it is a conductive material. For example, a metal material can be used. Examples of metal materials include silver, copper, and aluminum. As the material of the bus bars 17, for example, the same material as that of the conductive thin wires 16a to 16h can be used. The conductive thin wires 16a to 16h and the bus bars 17 may be integrally formed of the same material.

The line width W of each of the conductive thin wires 16a to 16h is preferably 5 µm or more. This is because in a case where the line width W of each of the conductive thin wires 16a to 16h is 5 µm or more, problems such as disconnection do not appreciably occur.

In addition, the line width W of each of the conductive thin wires 16a to 16h is 30 µm or less, preferably 20 µm or less, more preferably 18 µm or less, and still more preferably 16 µm or less. This is because when the line width W of each of the conductive thin wires 16a to 16h is 30 µm or less, it is difficult to visually recognize the lines, and it becomes more difficult to visually recognize the lines as the line width decreases to 20 µm or less, 18 µm or less, and 16 µm or less.

The difference ΔW between the minimum line width portion and the maximum line width portion of the conductive thin wires 16a to 16h is preferably 7 µm or less, more preferably 5 µm or less, and even more preferably 3 µm or less. This is because when ΔW is 7 µm or less, any discomfort caused by visual recognition can be reduced, and discomfort can be further reduced as ΔW becomes 5 µm or less and 3 µm or less.

The conductive thin wires 16a to 16h are separated from each other by a desired pitch P, and the pitch P is preferably 1 mm or more and 5 mm or less, more preferably 2 mm or more and 4 mm or less, and still more preferably 2 mm or more and 3 mm or less. This is because, when the pitch P between the conductive thin wires 16a to 16h is 1 mm or more, the density of the wires does not increase, and this can prevent the transmittance of the side glass from being lowered, and when the pitch P is 2 mm or more, this can furthermore prevent the transmittance from being lowered. Also, this is because when the pitch P of the conductive thin wires 16a to 16h is 5 mm or less, it is difficult to visually recognize the lines, and also, unevenness is less likely to occur in de-icing and defogging. As the pitch P of the conductive thin wires 16a to 16h is reduced to 4 mm or less and 3 mm or less, it becomes more difficult to visually recognize the lines, and also, unevenness is furthermore less likely to occur in de-icing and defogging. The pitch P may be constant at all times, or may change at any given position as will be described later.

The conductive thin wires 16a to 16h do not need to be disposed in an area corresponding to substantially the entire principal surface of the glass plates 11 and 12, and may be disposed in an area corresponding to at least a part of the principal face of the glass plates 11 and 12. In the example of FIG. 1, the wiring 16 is provided only in the lower portion of the side glass 10 in proximity to the windshield. As a result, the fog can be removed from the area in which the driver sees the door mirror through the side glass 10, so that the driver can easily see the door mirror.

The conductive thin wires 16a to 16h may be provided at the vehicle inner side or may be provided at the vehicle outer side with respect to the base material 15. In FIG. 1, for the sake of convenience, the line width W and the pitch P of the conductive thin wires 16a to 16h are depicted as being constant. However, one or both of the line width W and the pitch P of the conductive thin wires 16a to 16h may change partially at any given position between the first pole 17a and the second pole 17b of the bus bars 17.

Figure 3A:
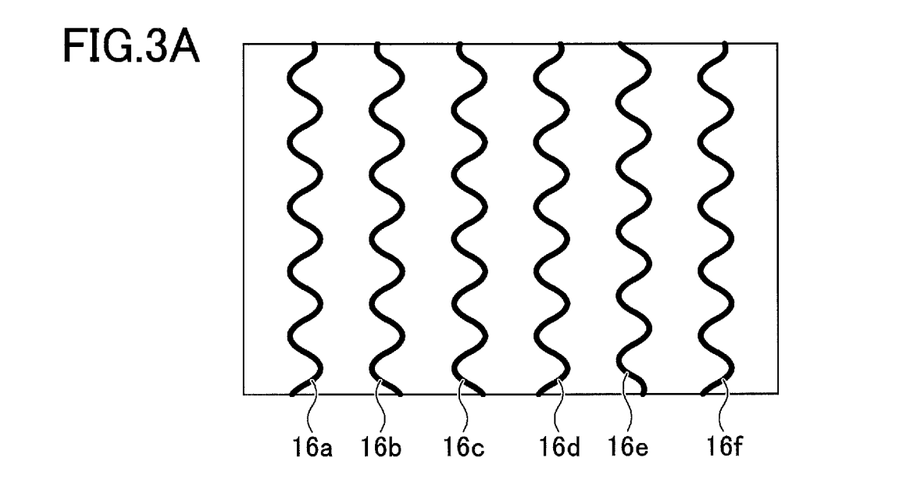
FIGS. 3A and 3B are drawings illustrating shapes of conductive thin wires.
Figure 3B:
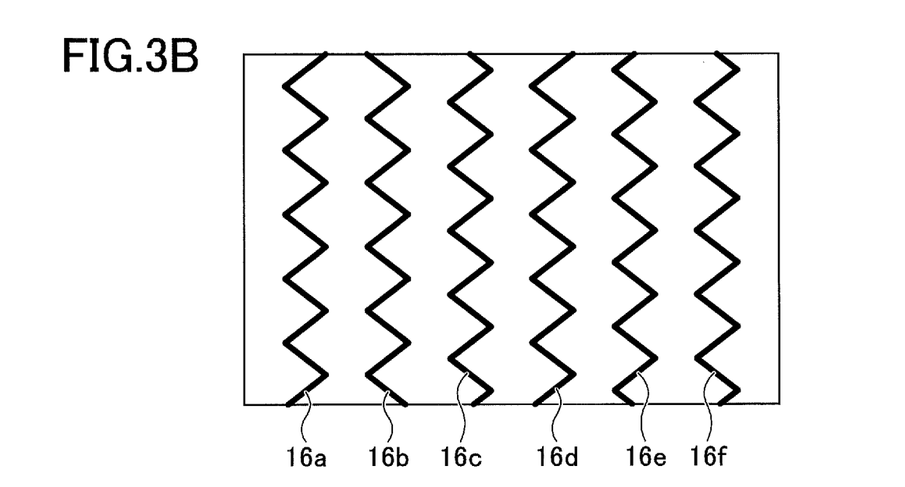

The conductive thin wires 16a to 16h are not limited to a straight line, and can be composed of any one or a combination of a straight line segment, a wavy line segment (e.g., a sine wave, a triangular wave, and a rectangular wave), and the like. The conductive thin wires 16a to 16h may be, for example, a sine wave illustrated in FIG. 3A, a triangular wave illustrated in FIG. 3B, others (for example, a square wave), a combination thereof, and a combination thereof further including a straight line. FIGS. 3A and 3B are partially enlarged views illustrating portion C of FIG. 1.

Further, in a case where the conductive thin wires 16a to 16h are wavy lines, the wavelength or period may change between the first pole 17a to the second pole 17b of the bus bars. When the conductive thin wires 16a to 16h are wavy lines, the phases of adjacent conductive thin wires 16a to 16h may be the same or shifted from each other, but it is preferable to shift the phases of adjacent conductive thin wires in terms of suppressing a light beam caused by regular scattering of light.

Also, the vehicle outer side and the vehicle inner side of the side glass 10 may have a coating for water repellency, ultraviolet cut, infrared cut, and visible light absorption functions, and a coating having low radiation characteristics. Also, the faces of the glass plates 11 and 12 that are in contact with the intermediate adhesive layer 13 or 14 may have a coating for, e.g., ultraviolet cut, infrared cut, low radiation characteristics, visible light absorption, coloring, and the like.

In order to produce the side glass 10, the glass plates 11 and 12 are produced by, for example, a float method. Also, the base material 15 is prepared, and the wiring 16 and bus bars 17 are formed on one of the faces of the base material 15. The wiring 16 and the bus bars can be integrally formed on one of the faces of the base material 15 by a known wiring forming method such as a subtractive method or a semi-additive method.

Next, the intermediate adhesive layers 13 and 14 are prepared, and a laminate in which the base material 15 formed with the wiring 16 and the bus bars 17 is sandwiched at a predetermined position between the intermediate adhesive layers 13 and 14 is manufactured. Then, the produced laminate is further inserted between the glass plates 11 and 12, and a laminated glass precursor (laminated glass before pressure bonding) in which the respective members are stacked in the order as illustrated in FIG. 2A is produced. The material and thickness of each member used at the above process is as described above.

Next, the laminated glass precursor is placed in a vacuum bag made of rubber, etc., and this vacuum bag is connected to an exhaust system, and the laminated glass precursor is bonded at a temperature of about 70 to 130 degrees Celsius while the vacuum bag is evacuated (degassed) to attain a pressure reduction of about −65 to −100 kPa from the atmospheric pressure (i.e., attain an absolute vacuum pressure) in the vacuum bag. As a result, laminated glass (i.e., the side glass 10 illustrated in FIG. 1) can be obtained.

Furthermore, laminated glass with higher durability can be obtained by performing pressure-bonding treatment through heating and pressurization under the conditions of, for example, 100 to 150 degrees Celsius and a pressure of 0.1 to 1.3 MPa. However, in some cases, this heating and pressurizing step may not be used in consideration of simplification of the process and the characteristics of the material to be enclosed in the laminated glass.

A pair of terminals or ports for supplying electric power from the outside are provided at the ends of the bus bars 17.

Thus, in the side glass 10, each of the resistance values of the conductive thin wires 16a to 16h is configured to be within a range of 10% or less with respect to the average value of the resistance values of the conductive thin wires 16a to 16h. Accordingly, the heat generation uniformity in the area of the side glass 10 where the conductive thin wires 16a to 16h are disposed can be improved.

Further, since the side glass 10 does not use a member, such as an insulating wiring, that disturbs the appearance, the appearance can be improved (a reduction in the visibility can be prevented). Furthermore, the line widths of the conductive thin wires 16a to 16h are configured to be 30 μm or less, and the difference in the line width between the minimum line width portion and the maximum line width portion of the conductive thin wires 16a to 16h is configured to be 7 μm or less. As a result, the line becomes difficult to visually recognize, and the sense of discomfort in seeing the line can be reduced. That is, the appearance can be further improved.

Second Embodiment

The second embodiment shows an example in which the number of turnarounds of the conductive thin wires is different from that of the first embodiment. In the second embodiment, the explanations about the same constituent elements as those already described may be omitted.

Figure 4:
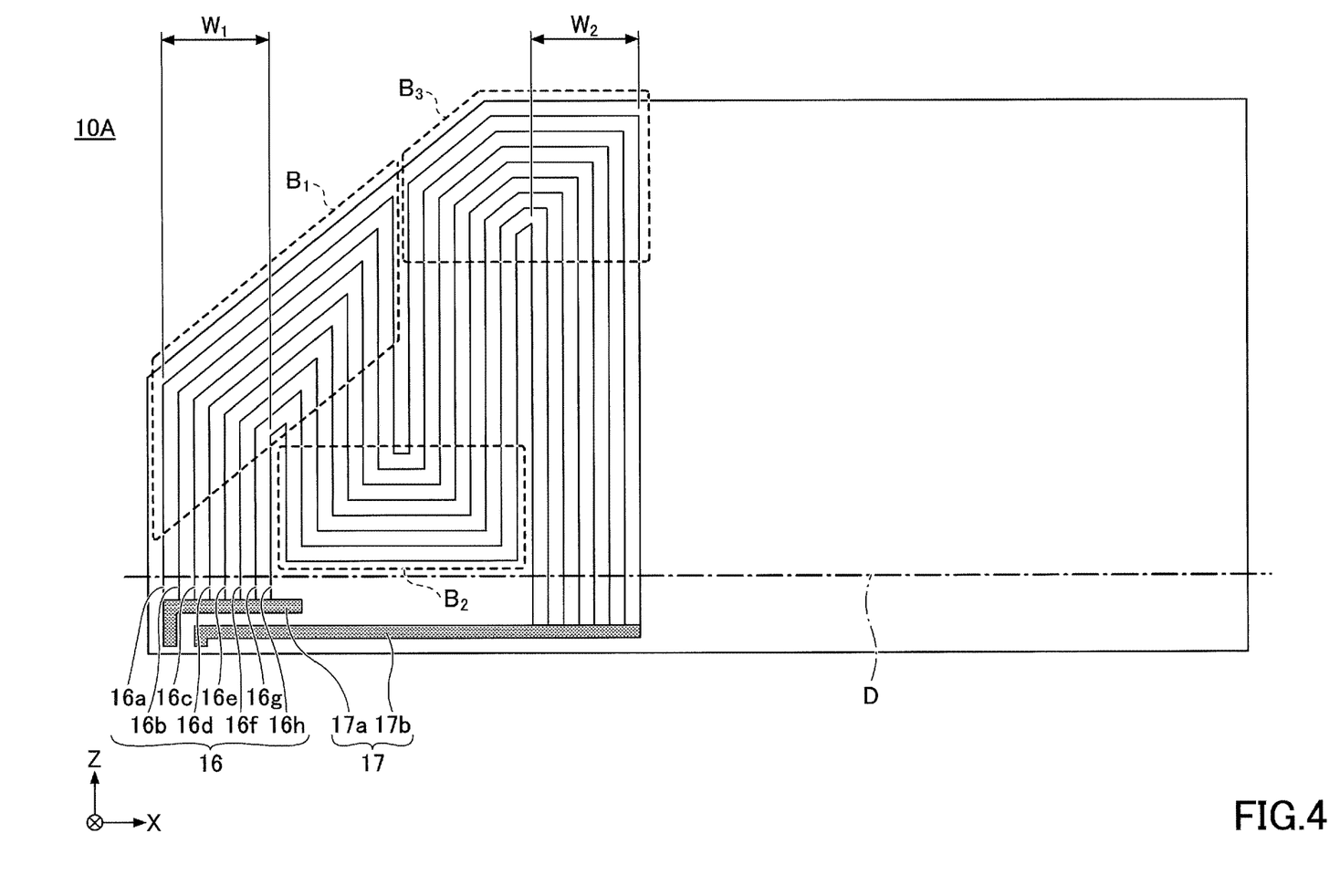
FIG. 4 is a drawing illustrating a side glass for a vehicle according to a second embodiment.

FIG. 4 is a drawing illustrating a side glass for a vehicle according to the second embodiment. A major difference of side glass 10A illustrated in FIG. 4 from the side glass 10 (see FIG. 1) is that the number of turnarounds of the conductive thin wires 16a to 16h is three.

More specifically, in the side glass 10A, the conductive thin wires 16a to 16h extending upward in the Z direction from the first pole 17a of the bus bar 17 are turned back in the vertical direction at a portion B1 to extend downward in the Z direction, and are turned back in the vertical direction at a portion B2 to extend upward in the Z direction. Then, the conductive thin wires 16a to 16h are further turned back in the vertical direction at a portion B3 to extend downward in the Z direction to reach the second pole 17b of the bus bar 17. Each of the resistance values of the conductive thin wires 16a to 16h is within a range of 10% with respect to the average value of the resistance values of the conductive thin wires 16a to 16h.

The conductive thin wires 16a to 16h have one aggregation in which a current flows in the same direction in an area corresponding to at least a part of the principal face of the glass plates.

The widths $W_1$ and $W_2$ of the band which is composed of the conductive thin wires 16a to 16h arranged in parallel with each other and which is a group of a plurality of the conductive thin wires are each preferably 12 cm or less. The widths $W_1$ and $W_2$ of the band are each a length in the X direction of the band of the conductive thin wires 16a to 16h from an outer side surface of the band at one outermost conductive thin wire 16a to an outer side surface of the band at the other outermost conductive thin wire 16h.

By configuring the widths $W_1$ and $W_2$ of the band to be 12 cm or less, the conductive thin wires 16a to 16h can be easily turned back, and the design flexibility of the arrangement of the conductive thin wires 16a to 16h can be improved. That is, this can prevent the width of the band of the conductive thin wires 16a to 16h from being too wide to be turned back, and to prevent a reduction in the degree of design flexibility due to the limitation on the number of turnarounds. However, when the width of the band of the conductive thin wires 16a to 16h is too narrow, the number of turnarounds will be too many, and the appearance will not be good, and furthermore, the design will be complicated. Therefore, the widths $W_1$ and $W_2$ of the band of the conductive thin wires 16a to 16h are each preferably 6 cm or more.

The side glass 10A has the following effects in addition to the effect of improving the heat generation uniformity and the effect of improving the appearance achieved by the side glass 10. In other words, in a case where the conductive thin wires 16a to 16h are turned back in the horizontal direction (X direction), the number of horizontal lines increases, so that the reflection of sunlight in the day time and the reflection of street lamps at night increases. Conversely, when the conductive thin wires 16a to 16h are turned back in the vertical direction (Z direction) as in the side glass 10A, the number of horizontal lines decreases, so that the reflection of sunlight in the day time and the reflection of street lamps at night can be reduced.

Also, since the conductive thin wires 16a to 16h are turned back in the vertical direction, even if the height of the side glass 10A changes in the design, the layout of the conductive thin wires 16a to 16h can be designed flexibly, and the design flexibility can be improved. Also, when the conductive thin wires 16a to 16h are turned three times in the vertical direction (the Z direction), it is easy to adjust the resistance values of the conductive thin wires 16a to 16h to an appropriate range. However, the number of turnarounds may be more than three. When the number of turnarounds is three or more, the resistance value of each of the conductive thin wires 16a to 16h can be configured to be closer to the average value as compared with the case where the number of turnarounds is one. Therefore, the number of turnarounds is configured to be three or more, so that the heat can be more uniformly generated than a case where the number of turnarounds is one.

Modification of Second Embodiment

The modification of the second embodiment shows an example in which detailed specifications are changed in the second embodiment. In the modification of the second embodiment, the explanations about the same constituent elements as those already described may be omitted.

Figure 5:
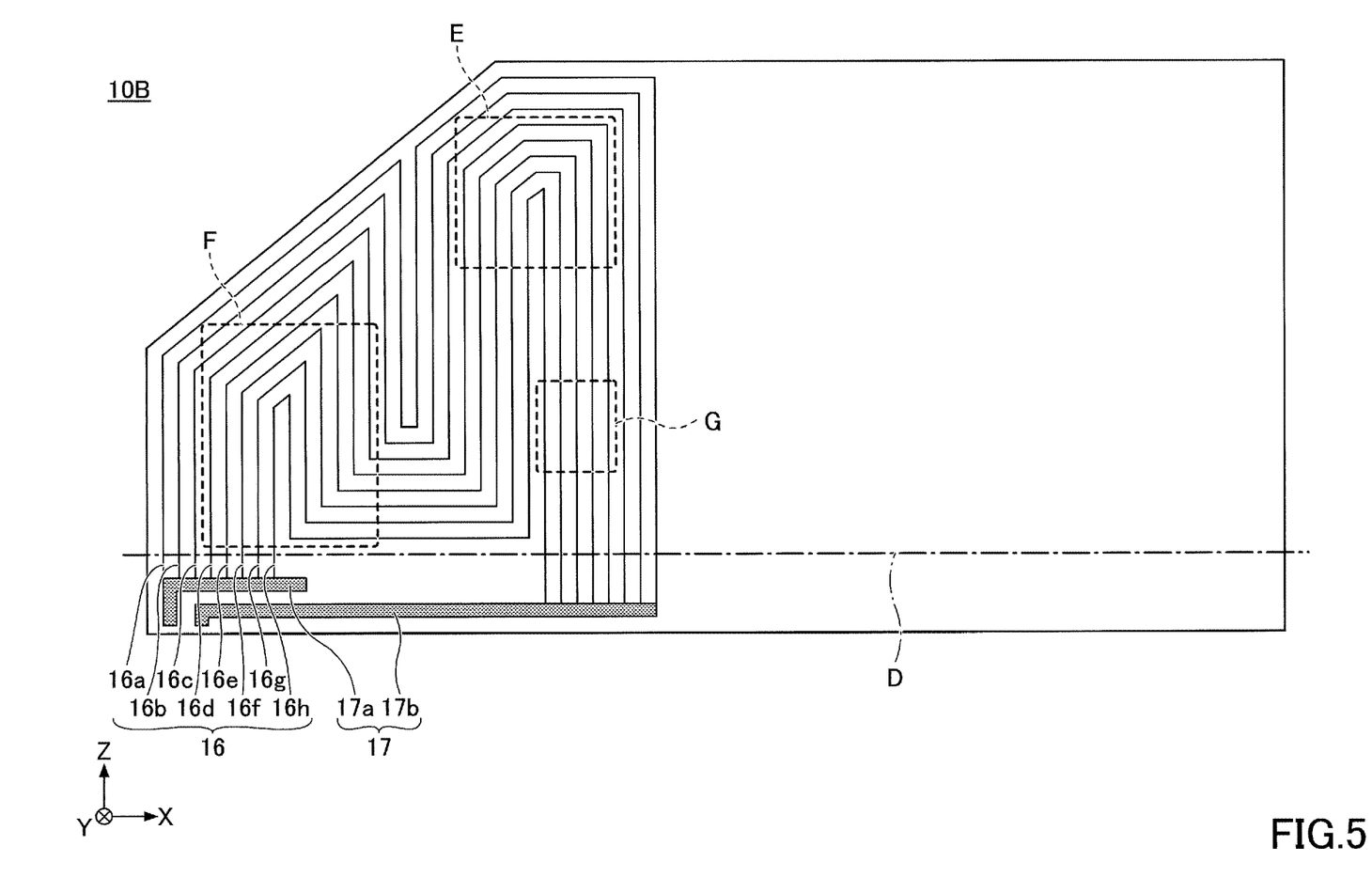
FIG. 5 is a drawing illustrating a side glass for a vehicle according to a modification of the second embodiment.

FIG. 5 is a drawing illustrating a side glass for a vehicle according to the modification of the second embodiment. The side glass 10B illustrated in FIG. 5 is generally similar to the side glass 10A (see FIG. 4), but the details are different.

Figure 6:
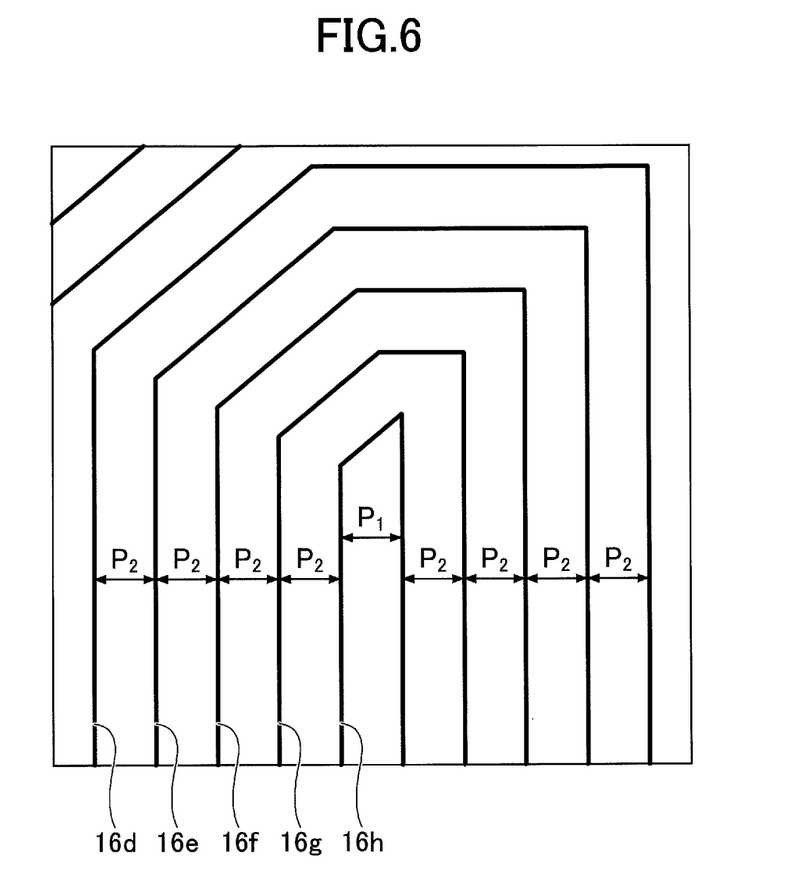
FIG. 6 is an enlarged view illustrating a portion E of FIG. 5.

FIG. 6 is an enlarged view illustrating a portion E of FIG. 5. As illustrated in FIG. 6, in the side glass 10B, a pitch $P_1$ between nearest line segments of an innermost conductive thin wire at the turnaround is equal to a pitch $P_2$ of conductive thin wires around the innermost conductive thin wire. In other words, the pitch $P_1$ of the conductive thin wire 16h turned back in the smallest loop is equal to the pitch $P_2$ of conductive thin wires around the conductive thin wire 16h. That is, in FIG. 6, the pitch $P_1$ is equal to each of the pitches $P_2$.

As described above, the pitch $P_1$ between nearest line segments of an innermost conductive thin wire at the turnaround is equal to a pitch $P_2$ of conductive thin wires around the innermost conductive thin wire, so that it is less likely to feel a sense of discomfort when seeing the side glass 10B, and the appearance can be improved.

Figure 7:
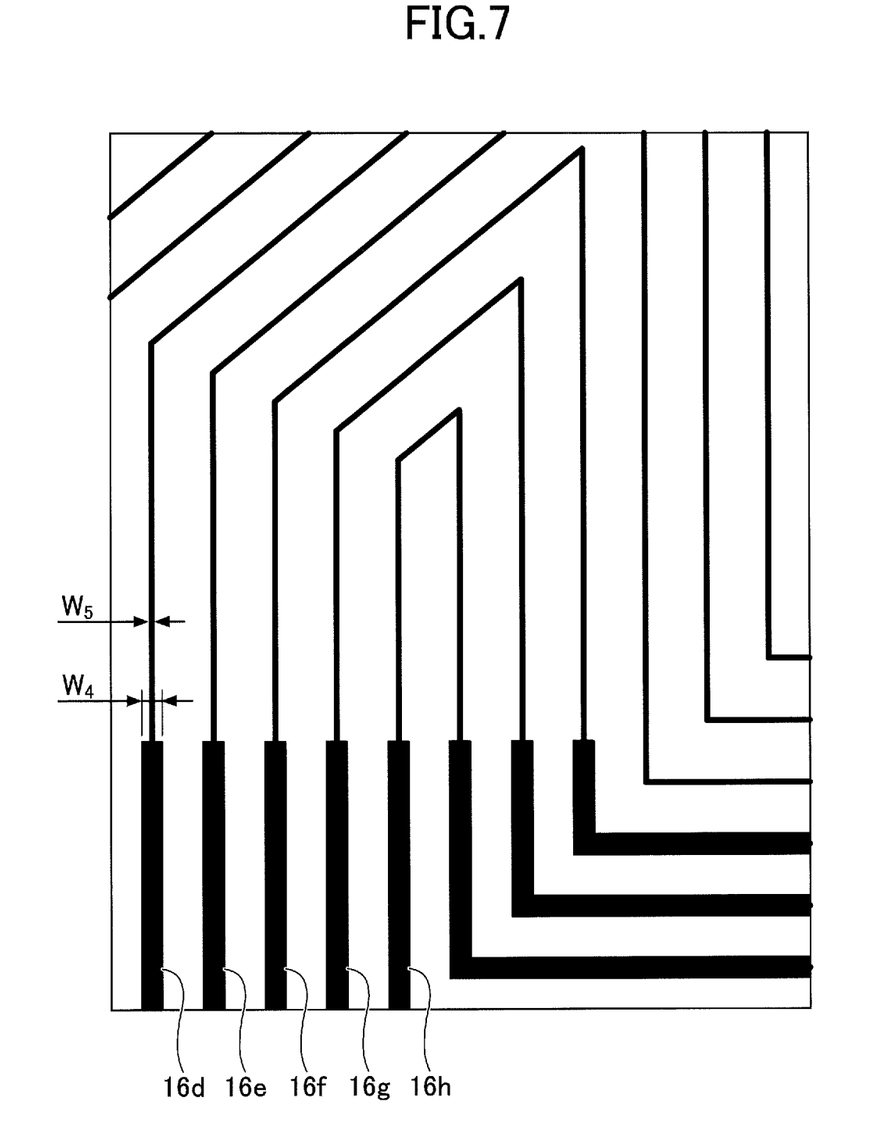
FIG. 7 is an enlarged view illustrating a portion F of FIG. 5.

FIG. 7 is an enlarged view illustrating a portion F of FIG. 5. As illustrated in FIG. 7, in the side glass 10B, the line widths of the conductive thin wires 16a to 16h change from $W_4$ to $W_5$ ($W_5<W_4$) at any given position between the first pole 17a and the second pole 17b of the bus bars 17. The relationship of the magnitude between $W_5$ and $W_4$ may be reversed.

Thus, by appropriately changing the line widths of the conductive thin wires 16a to 16h at any given position of the wiring, the heat can be efficiently generated for each area, and the appearance can be improved. For example, when it is desired to increase the heat generation only in any given area, it is effective to reduce the line widths of the conductive thin wires 16a to 16h only in that area. Conversely, to suppress heat generation only in any given area, the line widths of the conductive thin wires 16a to 16h may be increased. Also, the change of the line widths of the conductive thin wires 16a to 16h is not limited to the two steps, and the line widths of the conductive thin wires 16a to 16h may be changed in three or more steps as necessary. In addition, it is preferable in terms of appearance that the change of the line may occur smoothly over a certain length.

Figure 8:
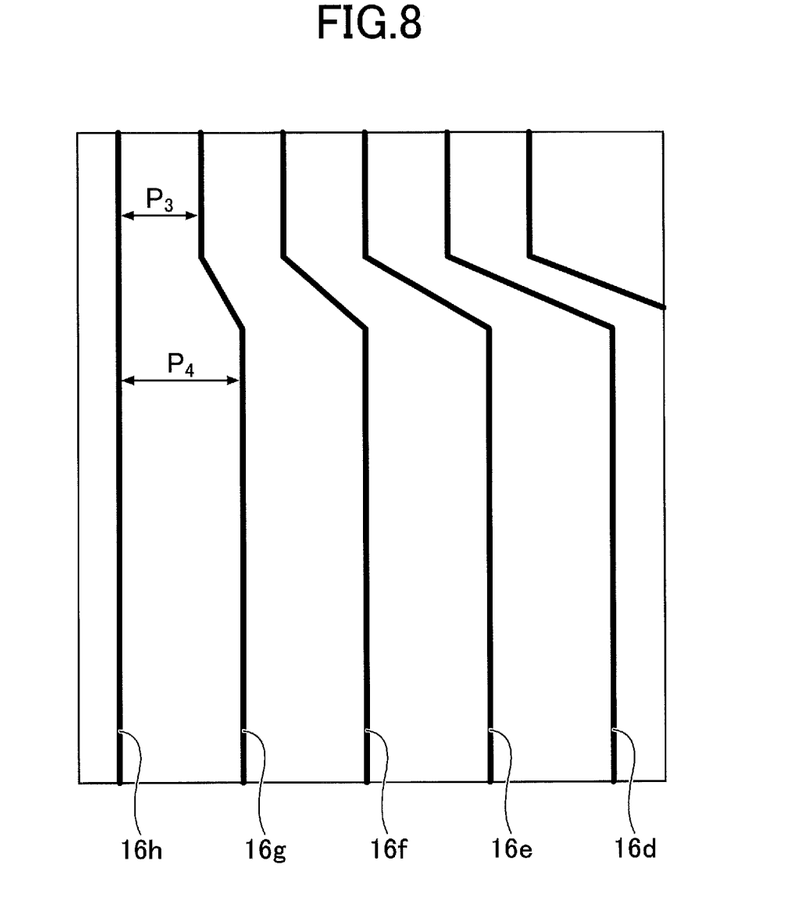
FIG. 8 is an enlarged view illustrating a portion G of FIG. 5.

FIG. 8 is an enlarged view illustrating a portion G of FIG. 5. As illustrated in FIG. 8, in side glass 10B, the pitch of the conductive thin wires 16a to 16h change from $P_3$ to $P_4$ ($P_3<P_4$) at any given position between the first pole 17a and the second pole 17b of the bus bars 17. The relationship of the magnitude between $P_3$ and $P_4$ may be reversed.

Thus, by appropriately changing the pitch of the conductive thin wires 16a to 16h, the heat can be efficiently generated for each area, and the appearance can be improved. For example, when it is desired to increase the heat generation only in any given area, it is effective to reduce the pitch of the conductive thin wires 16a to 16h only in that area. Conversely, to suppress heat generation only in any given area, the pitch of the conductive thin wires 16a to 16h may be increased. Also, the change of the pitch of the conductive thin wires 16a to 16h is not limited to the two steps, and the pitch of the conductive thin wires 16a to 16h may be changed in three or more steps as necessary.

In addition, both of the line width and the pitch of the conductive thin wires 16a to 16h may be changed at a time. For example, in FIG. 7, the pitch may be $P_4$ (wide) in the portion of the line width $W_4$ (thick portion) of the conductive thin wires 16a to 16h, and the pitch may be $P_3$ (narrow) in the portion of the line width $W_5$ (thin portion) of the conductive thin wires 16a to 16h.

However, even in a case where the line width and the pitch of the conductive thin wires 16a to 16h are changed, the resistance values of the conductive thin wires 16a to 16h are in a range of 10% with respect to the average value of the resistance values of the conductive thin wires 16a to 16h.

Third Embodiment

The third embodiment is an example for providing a plurality of sets of bus bars. In the third embodiment, the explanations about the same constituent elements as those already described may be omitted.

Figure 9:
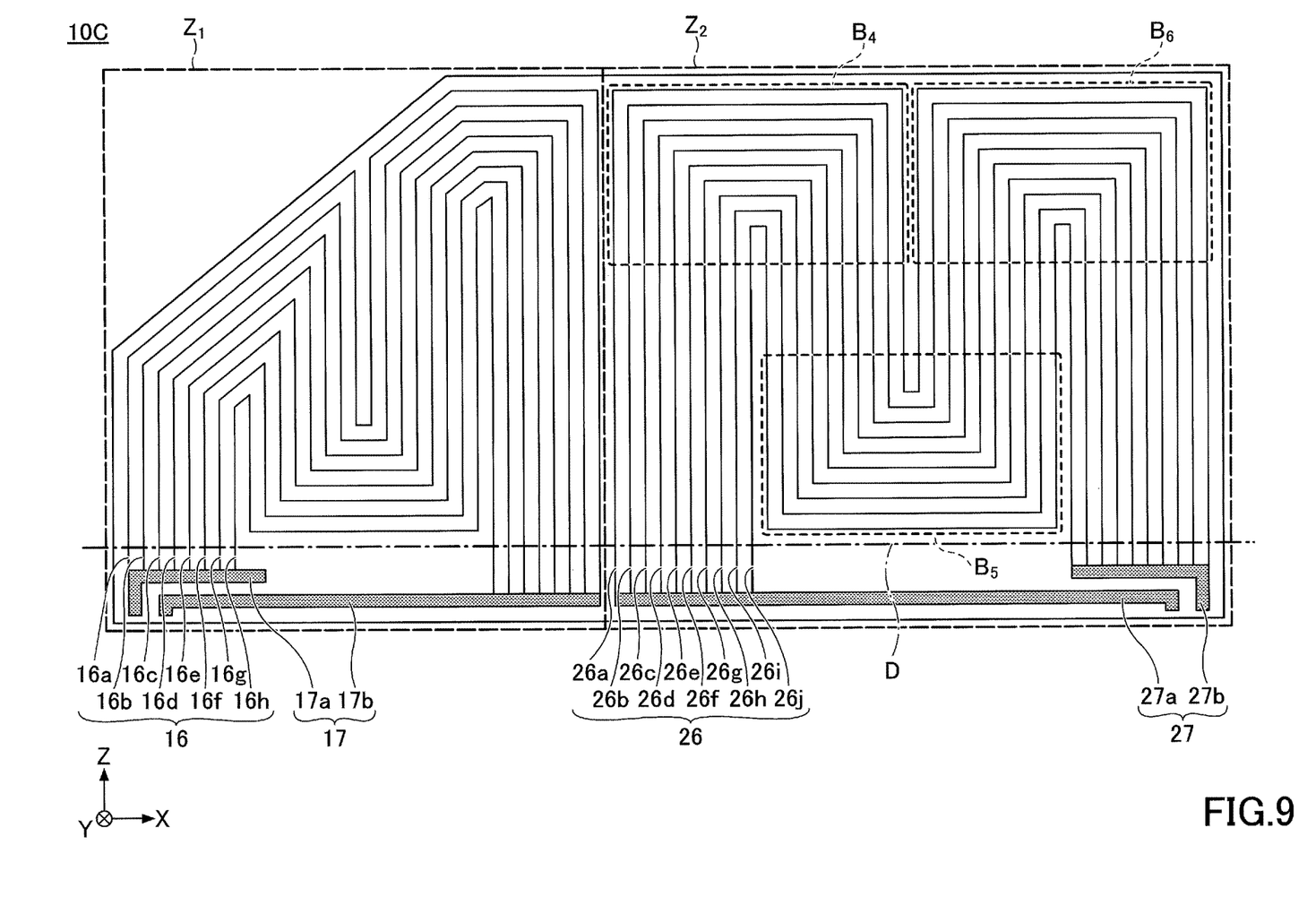
FIG. 9 is a drawing illustrating a side glass for a vehicle according to a third embodiment.

FIG. 9 is a drawing illustrating a side glass for a vehicle according to the third embodiment. The side glass 10C illustrated in FIG. 9 is different from the side glass 10A (see FIG. 4) in that the side glass 10C includes two zones (zone $Z_1$ and zone $Z_2$) arranged in parallel in the X direction and configured to be able to heat substantially the entirety of the side glass 10C. In the side glass 10C, the specification of the zone $Z_1$ is the same as that of the side glass 10A, and the explanation thereabout is omitted.

In the side glass 10C, the zone $Z_2$ is provided with one set of bus bars 27 independent of the bus bars 17 in the zone $Z_1$. In the present embodiment, there are two aggregations of conductive thin wires in which currents flow in the same direction, and there are also two sets of bus bars correspondingly. Both of the first pole 27a and the second pole 27b of the one set of bus bars 27 are arranged alongside a same side (same edge) of the side glass 10C (for example, a lower side or a lower edge). Additionally, the first pole 27a and the second pole 27b of the one set of bus bars 27 and the first pole 17a and the second pole 17b of the bus bars 17 are all arranged alongside the same side (same edge) of the side glass 10C (for example, a lower side or a lower edge). The bus bars 17 and 27 are preferably arranged below the alternate long and short dash line D. This is because the area below the alternate long and short dash line D is hidden in the vehicle body when the side glass 10 is attached to the vehicle, and therefore, this does not disturb the appearance. Furthermore, when the bus bars 17 are arranged alongside the lower side, the concealed area is sufficient and the bus bars 17 and the wiring 16 can be protected from moisture and the like, and therefore, the bus bars 17 are preferably arranged alongside the lower side.

In the zone $Z_2$, the wiring 26 is disposed. The wiring 26 includes conductive thin wires 26a to 26j arranged in parallel with each other on one of the faces of the base material 15. However, the wiring 26 including ten conductive thin wires 26a to 26j is an example, and the wiring 26 can include any number of two or more conductive thin wires.

In the zone $Z_2$, the conductive thin wires 26a to 26j are turned back three times in a manner similar to the zone $Z_1$ (portions $B_4$ to $B_6$ in FIG. 9). One end of each of the conductive thin wires 26a to 26j is electrically connected to the first pole 27a of the one set of bus bars 27, and the other end of each of the conductive thin wires 26a to 26j is electrically connected to the second pole 27b of the one set of bus bars 27.

The first pole 27a of the bus bar 27 is, for example, a positive electrode, and is connected to the positive side of a power source such as a battery mounted on the vehicle via a lead or the like. The second pole 27b of the bus bar 27 is, for example, a negative electrode and is connected to the negative side of the power source such as the battery mounted on the vehicle via a lead or the like. When a current is supplied to the conductive thin wires 26a to 26j from the power source such as a battery via the bus bars 27, the conductive thin wires 26a to 26j generate heat.

The heat generated by the conductive thin wires 26a to 26j is conducted to the glass plates 11 and 12, warming the glass plates 11 and 12, and removing fog caused by condensation on the glass plates 11 and 12, thus capable of maintaining high visibility for the passengers.

In the zone $Z_1$, the resistance value of each of the conductive thin wires 16a to 16h is in a range of 10% or less with respect to the average value of the resistance values of the conductive thin wires 16a to 16h. In the zone $Z_2$, the resistance value of each of the conductive thin wires 26a to 26j is in a range of 10% or less with respect to the average value of the resistance values of the conductive thin wires 26a to 26j. However, the average resistance value of the conductive thin wires arranged in zone $Z_1$ and the average resistance value of the conductive thin wires arranged in zone $Z_2$ may be the same, or may be different values.

That is, even when uniform heating is desired within each of the zones $Z_1$ and $Z_2$, uniform heating is not necessarily required between the zones. Rather, from the viewpoint of low power consumption, in an area where much heating is desired, the average resistance value of the conductive thin wires is reduced to efficiently heat the area, and in an area where much heating is not required, the average resistance value of the conductive thin wires is increased to suppress heating. For example, in the front zone $Z_1$ which is important when seeing a door mirror, it is desirable to reduce the average resistance value of the conductive thin wires to increase the heat generation performance.

The area to be heated may be divided into three or more zones, and bus bars may be provided independently for each zone. In each zone, the line widths and the pitches of the conductive thin wires may be partially changed.

As described above, the area to be heated is divided into a plurality of zones, and bus bars are provided independently for each zone, so that in each of the zones, the resistance value of each of the conductive thin wires can be easily configured to be within a range of 10% or less with respect to the average value of the resistance values of the conductive thin wires.

More specifically, for example, a case where substantially the entirety of the side glass 10C is heated will be considered. In this case, if the side glass is designed to have only a single zone, the wirings at the inner side are required to be turned many times in order to configure the resistance value of each of the conductive thin wires to be within a range of 10% or less with respect to the average value of the resistance values of the conductive thin wires. As a result, this makes it difficult to design and disturbs the appearance. When the area to be heated is divided into multiple zones, the conductive thin wires can be arranged in an area corresponding to substantially the entirety of the side glass 10C with a similar turn pattern.

In the present embodiment, a heat distribution structure can be designed as intended by defining multiple zones on the side glass 10C. Even in this case, in each of the zones, the heat generation uniformity in each of the zones can be improved by configuring the resistance value of each of the conductive thin wires to be within a range of 10% or less with respect to the average value of the resistance values of the conductive thin wires.

However, as the number of zones increases, the number of bus bars also increases, which makes the design be complicated. Therefore, from the viewpoint of productivity, the smaller the number of zones is, the better. In view of the above, the number of zones is preferably about three at most.

Fourth Embodiment

The fourth embodiment shows an example in which a wiring includes conductive thin wires having different numbers of turnarounds. In the fourth embodiment, the explanations about the same constituent elements as those already described may be omitted.

Figure 10:
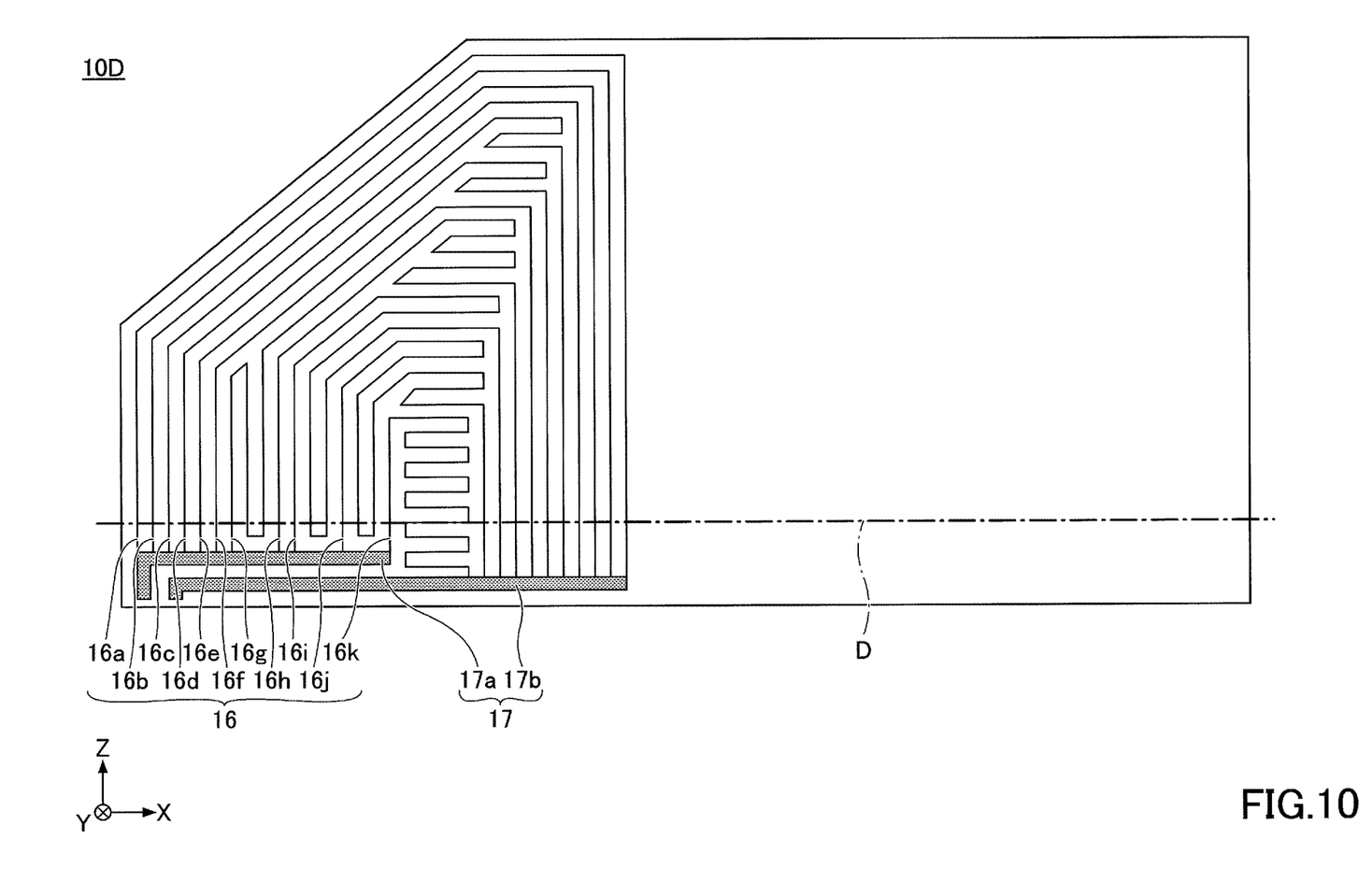
FIG. 10 is a drawing illustrating a side glass for a vehicle according to a fourth embodiment.

FIG. 10 is a drawing illustrating a side glass for a vehicle according to the fourth embodiment. The side glass 10D illustrated in FIG. 10 is different from the side glass 10A (see FIG. 4) in that a wiring 16 includes conductive thin wires in which the numbers of turnarounds are different.

On the side glass 10D, the wiring 16 includes conductive thin wires 16a to 16k arranged in parallel with each other on one of the faces of the base material 15. However, the wiring 16 including eleven conductive thin wires 16a to 16k is an example, and the wiring 16 can include any number of two or more conductive thin wires.

In the side glass 10D, for example, the number of turnarounds of the conductive thin wire 16a constituting the outermost loop extending between the first pole 17a and the second pole 17b of the bus bars 17 is one, but the number of turnarounds of the conductive thin wire 16k constituting the innermost loop is 10.

As described above, the numbers of turnarounds of the conductive thin wires are changed as necessary, so that the resistance value of each of the conductive thin wires can be configured to be within a range of 10% or less with respect to the average value of the resistance values of the conductive thin wires. In addition, the layout of conductive thin wires 16a to 16k can be flexibly designed without depending on the shape of the area to be heated, and the degree of design flexibility can be improved. However, in terms of appearance, the side glass 10A (see FIG. 4) in which the numbers of turnarounds of the conductive thin wires are the same is preferable.

The preferred embodiments and the like have been described in details above. However, the embodiments are not limited to the above-described embodiments and the like, and various modifications and substitutions can be applied to the above-described embodiments and the like without departing from the scope described in claims.

What is claimed is:

1. A laminated glass comprising:
   a pair of glass plates facing each other;
   a pair of intermediate adhesive layers positioned between the pair of glass plates and each being in contact with a corresponding one of the glass plates;
   a wiring positioned between the pair of intermediate adhesive layers; and
   one set of bus bars connected to the wiring,
   wherein the wiring includes a plurality of conductive thin wires arranged in parallel with each other between the bus bars constituting the one set, the bus bars being arranged alongside a same edge of the glass plates,
   wherein in an area corresponding to at least a part of a principal face of the glass plates, the conductive thin wires are arranged as one aggregation and include at least one turnaround,
   wherein a resistance value of each of the conductive thin wires is within a range of 10% or less with respect to an average value of resistance values of the conductive thin wires, and,
   wherein a pitch of the conductive thin wires is 1 mm or more and 5 mm or less.

2. The laminated glass according to claim 1, wherein each of the conductive thin wires includes three or more turnarounds in a vertical direction with respect to a vehicle to which the laminated glass is attached.

3. The laminated glass according to claim 1, wherein a width of a band constituted by the plurality of conductive thin wires arranged in parallel with each other is 12 cm or less.

4. The laminated glass according to claim 1, wherein a pitch between nearest line segments of an innermost conductive thin wire at the turnaround among the conductive thin wires is equal to a pitch of conductive thin wires around the innermost conductive thin wire at the turnaround.

5. The laminated glass according to claim 1, wherein a line width of each of the conductive thin wires is 30 m or less, and among the plurality of conductive thin wires, a difference in the line width between a minimum line width portion and a maximum line width portion is 7 m or less.

6. The laminated glass according to claim 1, wherein the plurality of conductive thin wires includes a conductive thin wire in which at least one of a line width and a pitch changes at any given position between a first pole and a second pole of the bus bars.

7. The laminated glass according to claim 1, wherein the plurality of conductive thin wires includes a conductive thin wire of a wavy line, and
   a period of the conductive thin wire of the wavy line changes at any given position between a first pole and a second pole of the bus bars.

8. The laminated glass according to claim 1, wherein the principal face of one of the glass plates is divided into a plurality of zones,
   one set of bus bars independent of another zone and a plurality of conductive thin wires arranged in parallel with each other between the bus bars constituting the one set are disposed in each of the zones.

9. The laminated glass according to claim 8, wherein for each of the zones, the average value of the resistance values of the conductive thin wires is different.

10. The laminated glass according to claim 1, wherein the plurality of conductive thin wires include conductive thin wires including different numbers of turnarounds.

11. The laminated glass according to claim 1, wherein the conductive thin wires include one of a straight line segment and a wavy line segment, or a combination thereof.

12. The laminated glass according to claim 1, wherein the conductive thin wires and the bus bars are made of silver, copper, or aluminum.

13. The laminated glass according to claim 1, wherein the aggregation of the conductive thin wires forms a circuit in which currents flow in a same direction.

* * * * *

UNITED STATES PATENT AND TRADEMARK OFFICE
CERTIFICATE OF CORRECTION

PATENT NO. : 11,510,289 B2
APPLICATION NO. : 16/746107
DATED : November 22, 2022
INVENTOR(S) : Yuhei Gima, Seiichi Miyasaka and Shigeru Nakamura It is certified that error appears in the above-identified patent and that said Letters Patent is hereby corrected as shown below:

In the Claims

Claim 5, Column 14, Line 22:
Please delete:
"line width of each of the conductive thin wires is 30 m or"
Please replace with:
line width of each of the conductive thin wires is 30 µm or Claim 5, Column 14, Line 25:
Please delete:
"portion and a maximum line width portion is 7 m or less."
Please replace with:
portion and a maximum line width portion is 7 µm or less.

Signed and Sealed this
Seventeenth Day of September, 2024

Katherine Kelly Vidal
*Director of the United States Patent and Trademark Office*